(12) United States Patent
Hayashida

(10) Patent No.: US 9,014,461 B2
(45) Date of Patent: Apr. 21, 2015

(54) IMAGE PROCESSING APPARATUS, IMAGE PROCESSING METHOD AND STORAGE MEDIUM

(71) Applicant: Canon Kabushiki Kaisha, Tokyo (JP)

(72) Inventor: Shinsuke Hayashida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/677,912

(22) Filed: Nov. 15, 2012

(65) Prior Publication Data

US 2013/0156285 A1    Jun. 20, 2013

(30) Foreign Application Priority Data

Dec. 15, 2011   (JP) .................................. 2011-275086

(51) Int. Cl.
| | |
|---|---|
| G06K 9/00 | (2006.01) |
| G06T 7/00 | (2006.01) |
| G06T 5/00 | (2006.01) |
| G06T 5/20 | (2006.01) |

(52) U.S. Cl.
CPC ............... G06T 7/0012 (2013.01); G06T 5/002 (2013.01); G06T 5/20 (2013.01); *G06T 2207/10116* (2013.01); *G06T 2207/20012* (2013.01)

(58) Field of Classification Search
None
See application file for complete search history.

(56) References Cited

U.S. PATENT DOCUMENTS

| | | | | |
|---|---|---|---|---|
| 7,433,448 | B2 * | 10/2008 | Schulz .......................... | 378/132 |
| 7,632,016 | B1 * | 12/2009 | Huang et al. .................. | 378/207 |
| 8,144,829 | B2 * | 3/2012 | Zhu et al. ......................... | 378/7 |
| 2006/0071174 | A1 * | 4/2006 | Spartiotis et al. ........ | 250/370.13 |
| 2007/0065038 | A1 * | 3/2007 | Maschauer et al. ........... | 382/274 |
| 2012/0020541 | A1 * | 1/2012 | Hayashida .................... | 382/132 |

FOREIGN PATENT DOCUMENTS

| | | |
|---|---|---|
| JP | 2002-034961 A | 2/2002 |
| JP | 2008-018047 A | 1/2008 |
| JP | 2010-263961 A | 11/2010 |

\* cited by examiner

*Primary Examiner* — Hadi Akhavannik
(74) *Attorney, Agent, or Firm* — Fitzpatrick, Cella, Harper & Scinto

(57) ABSTRACT

An image processing apparatus that processes a radiation image obtained from a detector in which a plurality of pixels are two-dimensionally arranged includes: an obtainment unit that obtains a radiation image; a control unit that controls, in accordance with radiation dose characteristics of a first pixel in the detector and a first pixel value of the first pixel in the radiation image, a weighting coefficient for the first pixel value of the first pixel and a weighting coefficient for second pixel values that are different from the first pixel value; and a correction unit that corrects the first pixel value in the obtained radiation image based on the weighting coefficients.

20 Claims, 11 Drawing Sheets

FIG. 7

| | CONVENTIONAL DEFECT CORRECTION METHOD (EXAMPLE) | DEFECT CORRECTION METHOD ACCORDING TO PRESENT INVENTION (EXAMPLE) |
|---|---|---|
| (A) LOW TO MEDIUM DOSE (NOT SATURATED AT ALL) | 0 0 0 / 0 1 0 / 0 0 0 | 0 0 0 / 0 1 0 / 0 0 0 |
| (B) HIGH DOSE (SLIGHTLY SATURATED) | 0 0 0 / 0 1 0 / 0 0 0 | 1 1 1 / 1 0.4 1 / 1 1 1 |
| (C) EXTREMELY HIGH DOSE (COMPLETELY SATURATED) | 1 1 1 / 1 0 1 / 1 1 1 | 1 1 1 / 1 0 1 / 1 1 1 |

FIG. 9

| | SATURATION CHARACTERISTIC MAPS (EXAMPLE) | MAPS OF DEFECT CORRECTION WEIGHTS IN PRESENT INVENTION AT LOW TO MEDIUM DOSE (EXAMPLE) | MAPS OF DEFECT CORRECTION WEIGHTS IN PRESENT INVENTION AT HIGH DOSE (EXAMPLE) | MAPS OF DEFECT CORRECTION WEIGHTS IN PRESENT INVENTION AT EXTREMELY HIGH DOSE (EXAMPLE) |
|---|---|---|---|---|
| (a) SATURATION CHARACTERISTIC MAPS ARE RANDOMLY DISTRIBUTED | 9 9 9 9 9 9<br>9 9 7 9 9 9<br>9 9 9 9 9 9<br>9 9 9 9 7 9<br>9 9 9 9 9 9<br>9 9 9 9 9 9 | 1 1 1 1 1 1<br>1 1 1 1 1 1<br>1 1 1 1 1 1<br>1 1 1 1 1 1<br>1 1 1 1 1 1<br>1 1 1 1 1 1 | 2 2 2 2 2 2<br>2 1 2 2 2 2<br>2 2 2 2 2 2<br>2 2 2 2 1 2<br>2 2 2 2 2 2<br>2 2 2 2 2 2 | 1 1 1 1 1 1<br>1 0 1 1 1 1<br>1 1 1 1 1 1<br>1 1 1 1 0 1<br>1 1 1 1 1 1<br>1 1 1 1 1 1 |
| (b) SATURATION CHARACTERISTIC MAPS ARE DISTRIBUTED IN ONE DIRECTION | 9 9 9 8 7 6<br>9 9 9 8 7 6<br>9 9 9 8 7 6<br>9 9 9 8 7 6<br>9 9 9 8 7 6<br>9 9 9 8 7 6 | 1 1 1 1 1 1<br>1 1 1 1 1 1<br>1 1 1 1 1 1<br>1 1 1 1 1 1<br>1 1 1 1 1 1<br>1 1 1 1 1 1 | 5 5 5 3 2 1<br>5 5 5 3 2 1<br>5 5 5 3 2 1<br>5 5 5 3 2 1<br>5 5 5 3 2 1<br>5 5 5 3 2 1 | 5 5 5 2 1 0<br>5 5 5 2 1 0<br>5 5 5 2 1 0<br>5 5 5 2 1 0<br>5 5 5 2 1 0<br>5 5 5 2 1 0 |
| (c) SATURATION CHARACTERISTIC MAPS ARE DISCONTINUOUSLY DISTRIBUTED | 9 9 9 6 6 6<br>9 9 9 6 6 6<br>9 9 9 6 6 6<br>9 9 9 6 6 6<br>9 9 9 6 6 6<br>9 9 9 6 6 6 | 1 1 1 1 1 1<br>1 1 1 1 1 1<br>1 1 1 1 1 1<br>1 1 1 1 1 1<br>1 1 1 1 1 1<br>1 1 1 1 1 1 | 5 5 5 1 1 1<br>5 5 5 1 1 1<br>5 5 5 1 1 1<br>5 5 5 1 1 1<br>5 5 5 1 1 1<br>5 5 5 1 1 1 | 8 8 8 1 1 1<br>8 8 8 1 1 1<br>8 8 8 1 1 1<br>8 8 8 1 1 1<br>8 8 8 1 1 1<br>8 8 8 1 1 1 |

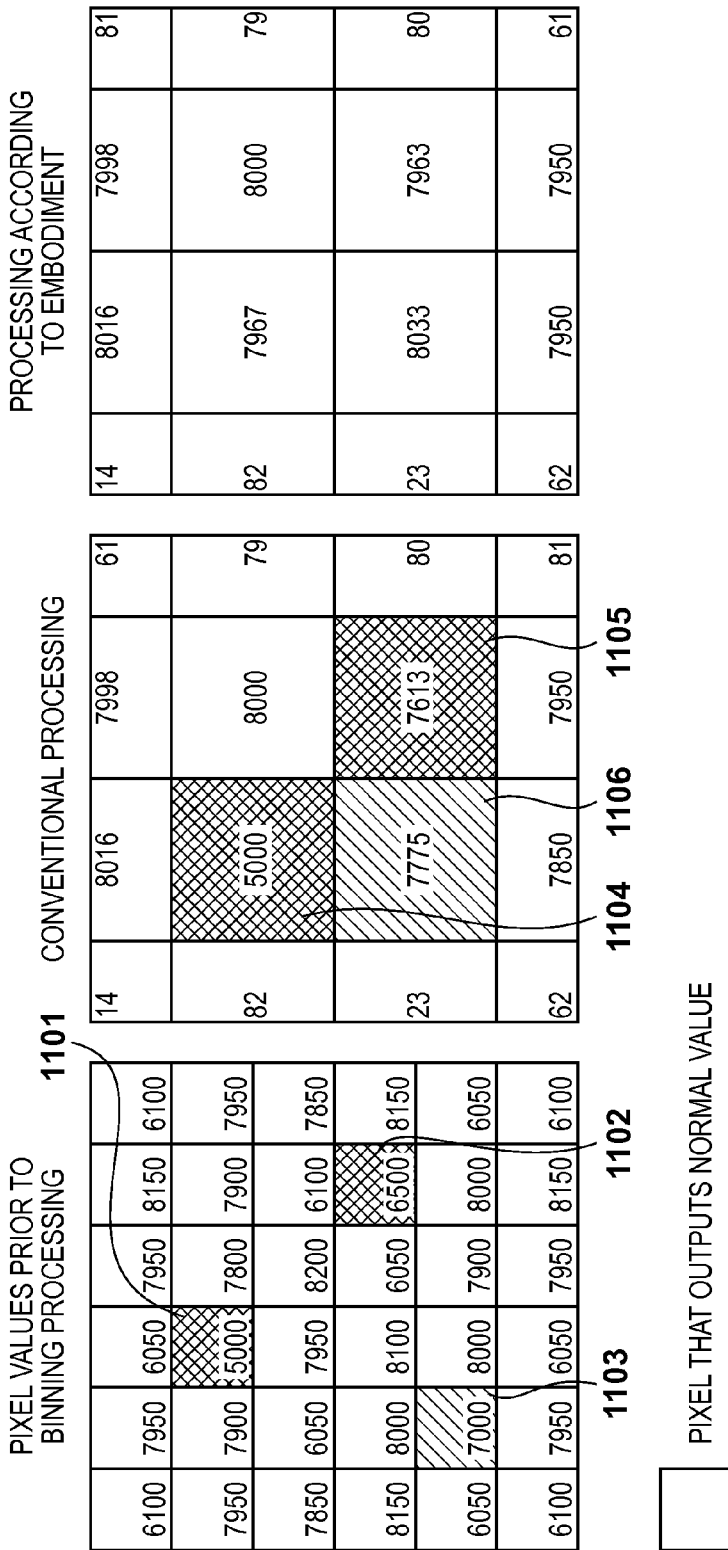

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, an image processing method and a storage medium.

2. Description of the Related Art

Recent demands for image digitalization have led to the use of digital imaging apparatuses with a function of outputting digital images as radiation imaging apparatuses that capture images of radiation transmitted through an object. In general imaging, apparatuses using an imaging plate that accumulates radiation images as latent images, and flat panel detectors (FPD) for radiation in which phosphors and a large-area amorphous silicon sensor are arranged in tight contact with each other, are in practical use in place of screen-film systems.

In the case of FPD, the electrical characteristics vary with each pixel. Therefore, FPD uses technology for outputting final images after executing correction processing. Pixels having different linearities depending on X-rays incident on FPD are subjected to technology for modeling and correcting the pixels. For example, U.S. Pat. No. 7,632,016 discloses technology for estimating pixel values using models obtained through γ correction.

Japanese Patent Laid-Open No. 2002-034961 discloses a method for appropriately correcting pixel defects even when pixels in the state of signal saturation change each time the imaging is performed.

As to weighting technology used in correction of defective pixels, for example, Japanese Patent Laid-Open No. 2008-18047 proposes a method for correcting defects through distance-based weighting.

Japanese Patent Laid-Open No. 2010-263961 proposes a method for changing temporal and spatial weighting in accordance with the mode of defective pixels in moving/still images.

However, radiation imaging apparatuses suffer from the problem that γ correction is not always performed appropriately because the approximation cannot be performed successfully for models using the dose characteristics of the same pixel (e.g. a saturated pixel value for which the approximation does not succeed).

In view of the above problem, the present invention provides technology that enables formation of high-quality images by controlling the settings for weighting output values of pixels using the input/output characteristics which define a relationship between incident doses and output values of pixels corresponding to the incident doses.

SUMMARY OF THE INVENTION

According to one aspect of the present invention, there is provided an image processing apparatus that processes a radiation image obtained from a detector in which a plurality of pixels are two-dimensionally arranged, comprising: an obtainment unit configured to obtain a radiation image; a control unit configured to, in accordance with radiation dose characteristics of a first pixel in the detector and a first pixel value of the first pixel in the radiation image, control a weighting coefficient for the first pixel value of the first pixel and a weighting coefficient for second pixel values that are different from the first pixel value; and a correction unit configured to correct the first pixel value in the obtained radiation image based on the weighting coefficients.

The present invention enables formation of high-quality images by controlling the settings for weighting output values of pixels using the input/output characteristics which define a relationship between incident doses and output values of pixels corresponding to the incident doses.

Further features of the present invention will become apparent from the following description of exemplary embodiments (with reference to the attached drawings).

BRIEF DESCRIPTION OF THE DRAWINGS

FIG. 7 shows comparison between defect correction of an image processing method according to an embodiment and a conventional method.

FIG. 9 shows the saturation characteristics of weights used in defect correction of an image processing method according to an embodiment.

FIGS. 11A to 11C show examples of pixel binning according to Second Embodiment.

DESCRIPTION OF THE EMBODIMENTS

The following describes a radiation imaging apparatus (image processing apparatus) and an image processing method according to embodiments of the present invention with reference to the accompanying drawings.

(First Embodiment)

Figure 1:
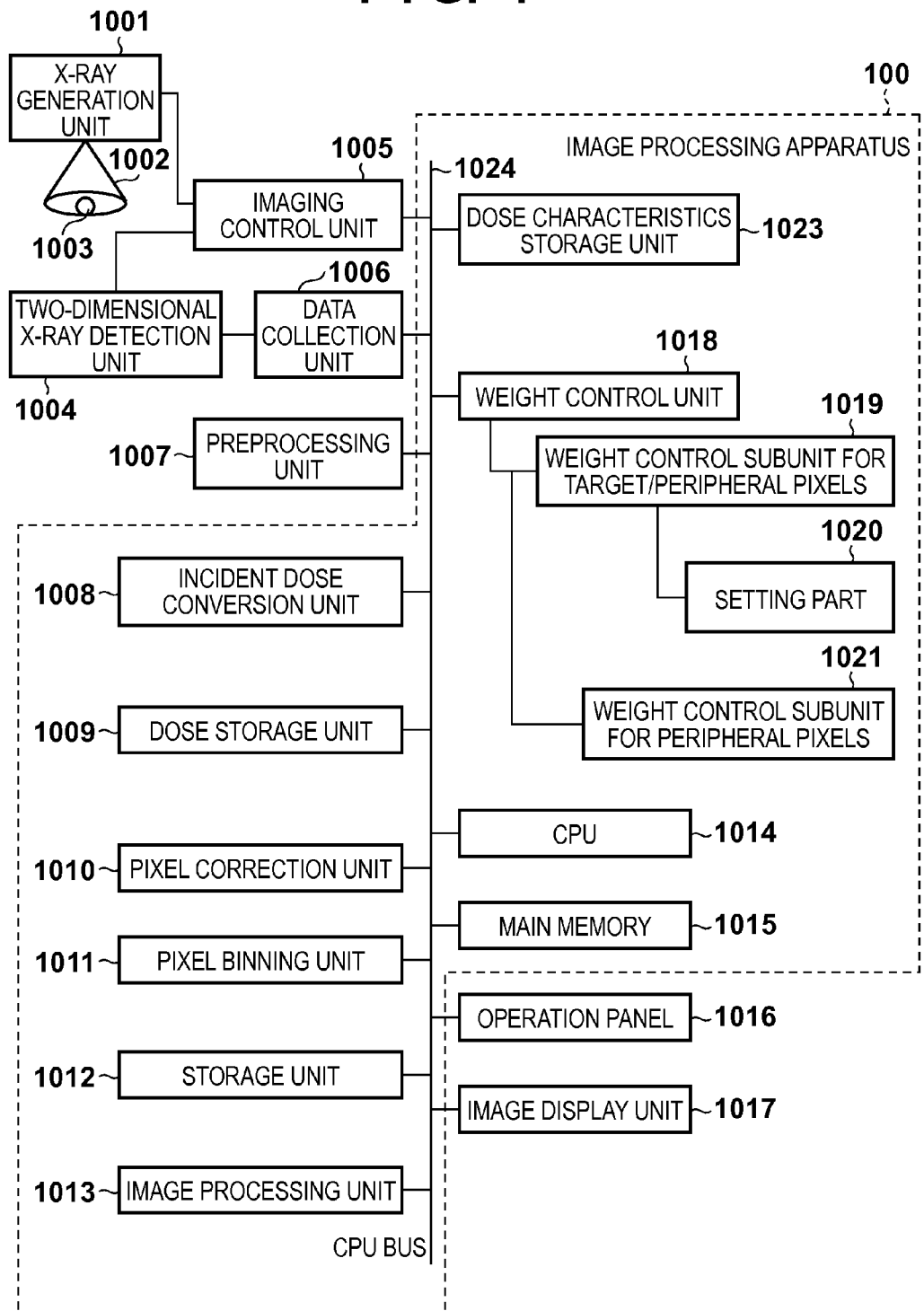
FIG. 1 is a schematic block diagram of an image processing apparatus according to an embodiment of the present invention.

FIG. 1 is a schematic block diagram of an image processing apparatus 100 according to an embodiment of the present invention. An X-ray generation unit 1001 projects an X-ray beam 1002 toward a subject 1003 under control of an imaging control unit 1005. The X-rays projected by the X-ray generation unit 1001 and transmitted through the subject 1003 are detected by a two-dimensional X-ray detection unit 1004. The X-ray generation unit 1001 and the two-dimensional X-ray detection unit 1004 are arranged facing each other with the subject 1003 positioned therebetween.

The imaging control unit 1005 controls the operations of the X-ray generation unit 1001 and the two-dimensional X-ray detection unit 1004 in accordance with an imaging instruction from an operation panel 1016. A data collection unit 1006 executes processing such as A/D conversion, amplification and image rearrangement on information (X-ray image signal) detected by the two-dimensional X-ray detection unit 1004. A preprocessing unit 1007 processes data (X-ray image data) obtained by the data collection unit 1006, and the processed data (original image data) is stored in a main memory 1015. The imaging control unit 1005, the data collection unit 1006 and the preprocessing unit 1007 are connected to a CPU bus 1024.

The image processing apparatus 100 processes an X-ray image obtained through the X-ray imaging. The main memory 1015, an image processing unit 1013, at least one CPU 1014, the operation panel 1016, and an image display unit 1017 are connected to the CPU bus 1024. Furthermore, an incident dose conversion unit 1008, a dose storage unit 1009, a pixel correction unit 1010, a pixel binning unit 1011, a storage unit 1012, a dose characteristics storage unit 1023, and a weight control unit 1018 are also connected to the CPU bus 1024.

The main memory 1015 stores, for example, various types of data necessary for processing of the CPU 1014, such as programs for executing processing shown in the flowcharts of FIGS. 2 and 3, which will be described later. Also, the main memory 1015 functions as a working memory for the CPU 1014. The CPU 1014 executes instructions included in the programs stored in the main memory. The CPU 1014 also controls the overall operations of the image processing apparatus 100 using the various types of data stored in the main memory 1015 in accordance with the operations received via the operation panel 1016.

The preprocessing unit 1007 executes, for example, gain correction processing for correcting variations in sensitivity of pixels in the two-dimensional X-ray detection unit 1004, and dark current correction processing for correcting variations in dark current of pixels in the two-dimensional X-ray detection unit 1004. Before a user performs the radiation imaging, the preprocessing unit 1007 stores images for gain correction and dark current correction in the main memory 1015. At the time of correction, the preprocessing unit 1007 calls the images for gain correction and dark current correction as necessary.

When the user inputs an imaging instruction via the operation panel 1016, the details of the imaging instruction are stored in the storage unit 1012 and displayed on the operation panel 1016.

At the time of factory shipment, information indicating dose characteristics of pixels in the two-dimensional X-ray detection unit 1004 is obtained in the inspection step, and the obtained information of the pixels is stored in the dose characteristics storage unit 1023. For example, information of the pixels indicating a relationship between incident X-rays and X-ray image signals output from the two-dimensional X-ray detection unit 1004 (input/output characteristics), and dose-dependent maps are stored in the dose characteristics storage unit 1023 as the information of the pixels indicating the dose characteristics. With image data obtained through projection of radiation, doses can be obtained using the incident dose conversion unit 1008. The obtained doses are stored in the dose characteristics storage unit 1023 on a per-pixel basis.

The pixel correction unit 1010 corrects defective pixel values of the original image data and pixel values with undesirable linearity using the dose-dependent maps. The dose-dependent maps are information indicating distribution of the input/output characteristics of pixels including the saturation characteristic values of the two-dimensional X-ray detection unit 1004. Under control of the CPU 1014, the corrected image data is transferred to the main memory 1015 via the CPU bus 1024.

When the user instructs projection of radiation (X-rays) from the X-ray generation unit 1001 using the operation panel 1016, the imaging control unit 1005 causes the radiation imaging to be performed by controlling the X-ray generation unit 1001 and the two-dimensional X-ray detection unit 1004.

In radiation imaging, the X-ray generation unit 1001 first projects the X-ray beam 1002 toward the subject 1003. The projected X-ray beam 1002 is transmitted through the subject 1003 while being attenuated, and arrives at the two-dimensional X-ray detection unit 1004. Then, the two-dimensional X-ray detection unit 1004 outputs an X-ray image signal. For example, when the subject 1003 is a human body, the X-ray image signal output from the two-dimensional X-ray detection unit 1004 is an image of the human body.

The data collection unit 1006 converts the X-ray image signal output from the two-dimensional X-ray detection unit 1004 into a predetermined digital signal by executing, for example, A/D conversion, and supplies the predetermined digital signal to the preprocessing unit 1007 as X-ray image data. The preprocessing unit 1007 executes preprocessing such as dark current correction processing and gain correction processing on the X-ray image data.

Under control of the CPU 1014, the X-ray image data that has been subjected to the preprocessing is transferred to the main memory 1015 via the CPU bus 1024 as the original image data. With the use of the dose-dependent maps stored in the dose characteristics storage unit 1023, the pixel correction unit 1010 corrects pixel values of defective pixels, which are pixels that have no reaction to the incident dose, and corrects output values with which linearity does not hold with respect to the incident dose. Under control of the CPU 1014, image data obtained through the correction is transferred to and stored in the storage unit 1012 via the CPU bus 1024.

The weight control unit 1018 controls the settings associated with weights for pixels in the two-dimensional X-ray detection unit 1004 using the input/output characteristics (dose-dependent maps) and doses measured on a per-pixel basis. The pixel correction unit 1010 performs dose-dependent pixel correction in accordance with the weights set by the weight control unit 1018.

The weight control unit 1018 is composed of a weight control subunit 1019 for target/peripheral pixels and a weight control subunit 1021 for peripheral pixels. The weight control subunit 1019 for target/peripheral pixels includes a setting part 1020 that sets the weight for one pixel targeted for correction, or the weight for peripheral pixels, out of a plurality of pixels constituting the two-dimensional X-ray detection unit 1004, to zero (hereinafter, one pixel targeted for correction may be referred to as the target pixel). The weight control unit 1018 controls weights to be applied in spatial and temporal correction of defective pixels based on the information stored in the dose characteristics storage unit 1023.

Under control of the CPU 1014, the X-ray image data that has been subjected to pixel correction processing is transferred to the main memory 1015 and the image processing unit 1013 via the CPU bus 1024 as the original image data. The image processing unit 1013 executes image processing such as noise reduction processing, frequency processing, and tone processing. The image data that has been subjected to the image processing is displayed on the image display unit 1017.

Figure 2:
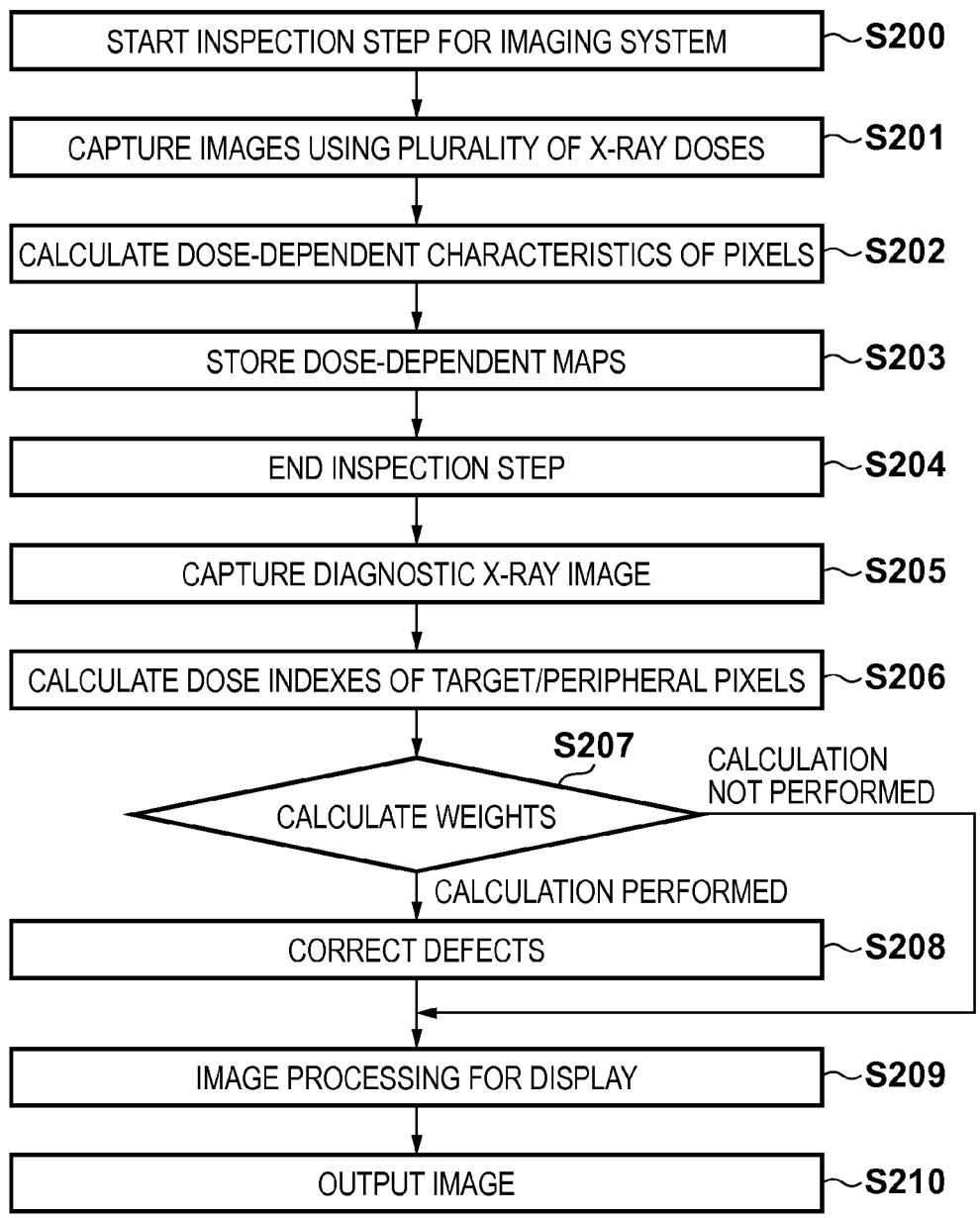
FIG. 2 shows an image processing method according to an embodiment.

FIG. 2 is a flowchart of an image processing method used in an image processing apparatus according to an embodiment. Steps S200 to S204 are processes for obtaining information of pixels indicating the dose characteristics of the two-dimensional X-ray detection unit 1004. It is preferable that steps S200 to S204 be performed during, for example, product inspections before shipping the products. Steps S205 to S209 are processes for performing dose-dependent pixel correction on pixels that have small saturation characteristic values in an X-ray image captured for diagnostic purpose.

First, in step S200, the CPU 1014 instructs commencement of the inspection step for the X-ray imaging system, and the imaging control unit 1005 activates the two-dimensional X-ray detection unit 1004. In step S201, the imaging control unit 1005 captures X-ray images using a plurality of doses by controlling the X-ray generation unit 1001 and the two-dimensional X-ray detection unit 1004. The X-ray images are captured using a plurality of doses and stored because the present embodiment aims to obtain the dose-dependent characteristics (input/output characteristics) on a per-pixel basis. The stored input/output characteristics of pixels corresponding to different X-ray doses serve as basic data used to obtain the saturation characteristic values.

In step S202, the CPU 1014 calculates the dose-dependent characteristics (input/output characteristics) of pixels in the X-ray images obtained in S201 in correspondence with different X-ray doses, so as to generate dose-dependent maps showing distribution of the input/output characteristics of the pixels in the two-dimensional X-ray detection unit 1004. The CPU 1014 calculates the saturation characteristic values from the calculated dose-dependent characteristics (input/output characteristics) using a method that will be described with reference to FIG. 4. Note that a saturation characteristic value denotes a value of a dose at which the linearity of the input/output characteristics falls below a reference by 3%. The dose-dependent maps are generated from the result of calculation of the saturation characteristic values as information showing distribution of the input/output characteristics of pixels.

In step S203, the CPU 1014 stores the dose-dependent maps in the dose characteristics storage unit 1023. It is ideal that the dose-dependent maps be expressed using a single variable as with $\gamma$ characteristics. However, in reality, it is often difficult to express the input/output characteristics of the two-dimensional X-ray detection unit 1004 corresponding to the X-ray doses using a single variable. With such a two-dimensional X-ray detection unit 1004, it is possible to correct dose dependency of pixels using the dose-dependent characteristics (input/output characteristics) and the dose-dependent maps stored in the dose characteristics storage unit 1023. For example, even when a diagnostic image captured with a high X-ray dose includes pixels that look like defective pixels, dose dependency of the pixels can be appropriately corrected.

In step S204, the CPU 1014 ends the inspection step for the X-ray imaging system. As the dose-dependent characteristics (input/output characteristics) are obtained on a per-pixel basis in correspondence with each dose before shipping the radiation imaging apparatus (image processing apparatus), defective pixel correction can be performed on a pixel that has a high or low saturation pixel value compared to a reference using the target pixel and peripheral pixels. Note that the inspection prior to the shipment is not limited to being applied to the X-ray imaging. For example, in the case of an image processing apparatus that converts X-rays into visible light using phosphors, the inspection may be performed using visible light.

Steps S205 to S209 are processes for capturing a diagnostic X-ray image, which are executed after the inspection step for the X-ray system. With respect to X-ray image data obtained through the X-ray imaging, dose-dependent pixel correction is performed on pixels having small saturation characteristic values (their pixel values at which the linearity does not hold are smaller than a reference value). First, in step S205, the imaging control unit 1005 captures a diagnostic X-ray image. In general, the imaging control unit 1005 captures an X-ray image of an object, e.g. a living body, in a hospital or the like. It goes without saying that the range of application of the present invention includes non-diagnostic X-ray images and industrial X-ray images.

When capturing the diagnostic X-ray image, information input to the operation panel 1016 with regard to parts to be captured, and spatial frequency emphasis parameters corresponding to the parts, are stored in the main memory 1015. Furthermore, the X-ray doses that have arrived at the two-dimensional X-ray detection unit 1004, the X-ray image signal, etc. are processed by the data collection unit 1006 and the preprocessing unit 1007 and transmitted to the main memory 1015.

In step S206, the incident dose conversion unit 1008 calculates the incident doses (or equivalent values thereof) corresponding to the target/peripheral pixels based on pixel values of the target/peripheral pixels. The incident doses are obtained based on at least one of the average value of pixel values in each region and a standard deviation. Although dose index values of the entire image, such as exposure index (EI) values, may be used as the incident doses, it is desirable to calculate the doses on a per-pixel basis or on a per-region basis in the X-ray image.

In step S207, the weight control unit 1018 determines whether or not to calculate weights. When the weights are not to be calculated, the processing moves to step S209. On the other hand, when the weights are to be calculated, the weight control unit 1018 calculates the weights based on the dose-dependent maps and the incident doses, and the processing moves to step S208.

In step S208, the pixel correction unit 1010 corrects output values of pixels using the peripheral pixels and the target pixel in accordance with control based on the weights calculated in step S207.

In step S209, the image processing unit 1013 executes image processing for display. The image processing for display is roughly classified into tone processing, frequency processing, and pixel number processing. The tone processing is for causing the density of interest of a captured image to express tones on a monitor or the like. The frequency processing is frequency emphasis processing for appropriately expressing the frequency of interest of a captured image. In general, when performing display on a monitor or the like through the pixel number processing including binning processing and cut-out processing, an image including 1024 pixels or 2048 pixels is often used. Therefore, in the pixel number processing, the number of pixels is converted for display. In accordance with control based on the weights calculated in the preceding step, output values of pixels are corrected using the peripheral pixels and the target pixel.

In step S210, the CPU 1014 causes the image display unit 1017 to display/output the image that has been subjected to the image processing for display.

Figure 3:
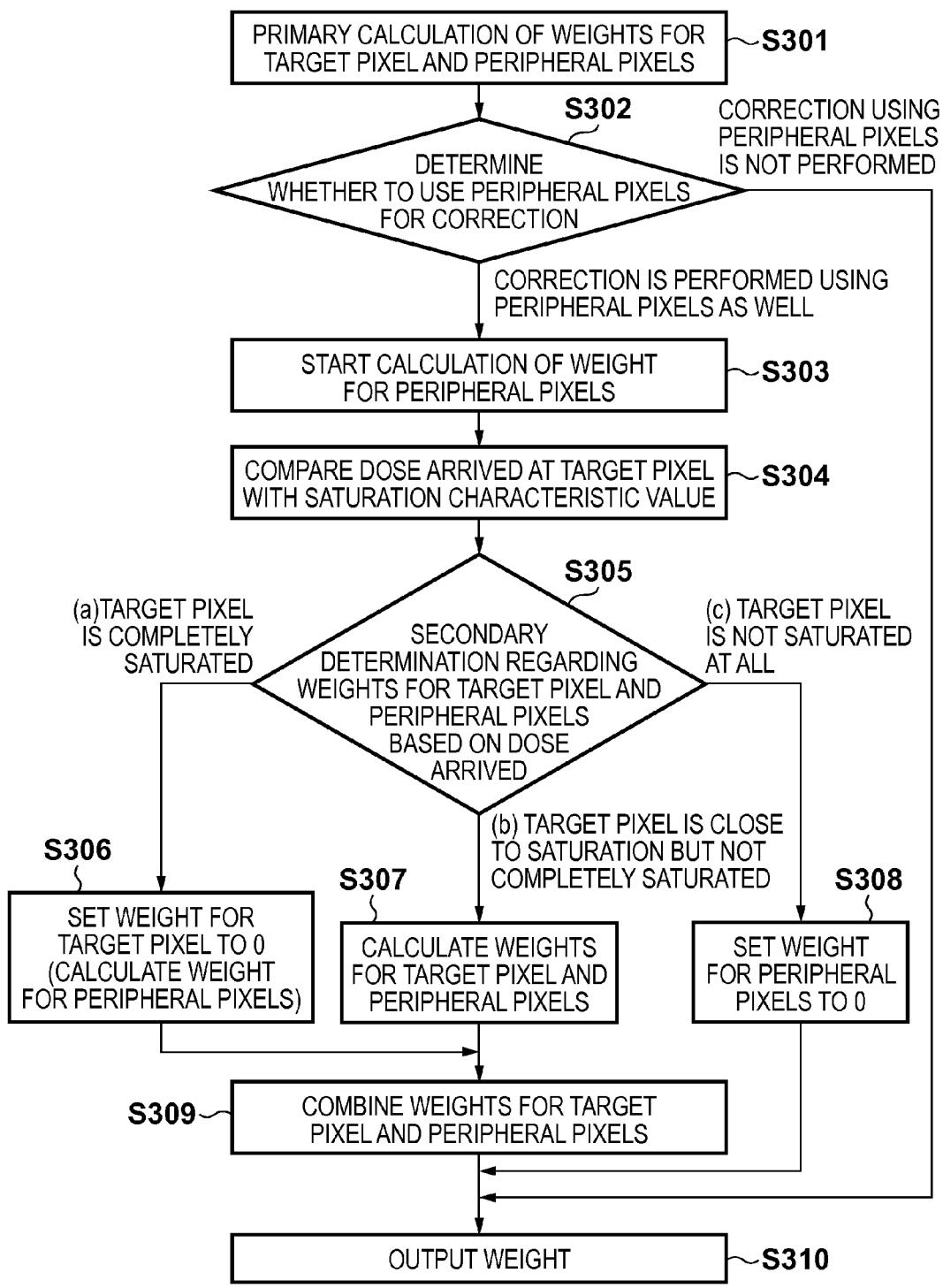
FIG. 3 shows a flow of dose-based weight calculation processing of an image processing method according to an embodiment.

FIG. 3 is a flowchart of dose-based weight calculation processing. This flowchart is a detailed illustration of the process of step S207 in FIG. 2.

In step S301, the weight control unit 1018 obtains the saturation characteristic values of pixels from the dose characteristics storage unit 1023. The weight control unit 1018 then calculates the weight for the output value of one pixel (target pixel) out of a plurality of pixels constituting the two-dimensional X-ray detection unit 1004 and the weight for the output values of peripheral pixels adjacent to one pixel (target pixel). In this process, when the saturation characteristic value is larger than a predetermined threshold, the weight for the output value of the target pixel is "1", and the weight for the output values of the peripheral pixels is "0". On the other hand, when the saturation characteristic value is smaller than the predetermined threshold, the weight for the output value of the target pixel is smaller than "1", and the weight for the output values of the peripheral pixels is larger than "0".

This process is for correcting only pixels that have a somewhat small saturation characteristic value. It is considered that pixels with undesirable linearity are only part of the entire output of a two-dimensional sensor. The load imposed by performing the process of step S303 and the subsequent processes for all pixels can be reduced.

According to the result of determination as to whether the weight for the target pixel is "1" and the weight for the peripheral pixels is "0", the processing moves to one of two branches in step S302. When the weight for the target pixel is "1" and the weight for the peripheral pixels is "0" in step S301, there is no need to perform dose-dependent pixel correction, and therefore the processing ends with the weight output indicating that the value of the target pixel is used as-is (step S310).

On the other hand, when the weight for the target pixel is smaller than "1" and the weight for the peripheral pixels is larger than "0" as a result of determination in step S302, the processing moves to step S303. Steps S303 to S308 represent a flow of calculation of the weight for the peripheral pixels.

In step S303, calculation of the weight for the peripheral pixels is started with respect to the pixel assigned in step S302 so as to perform correction using the peripheral pixels as well.

In step S304, the dose that has arrived at the target pixel (the incident dose) is compared with the saturation characteristic value obtained before shipment. For example, it is assumed here that the incident dose is X, and the saturation characteristic value obtained before shipment is Y.

(a) When a difference between the incident dose X and the saturation characteristic value Y is larger than a first reference value indicating that the input/output characteristics of the target pixel (pixel value) are saturated, it is determined that the target pixel is saturated. For example, when X−Y>1000 (first reference value), it is determined that the target pixel is completely saturated, and the processing moves to step S305.

(b) When the difference between the incident dose X and the saturation characteristic value Y is smaller than or equal to the first reference value and exceeds a second reference value indicating that the linearity of the input/output characteristics of the target pixel is maintained, it is determined that the target pixel is close to a saturated state. For example, when 1000 (first reference value)≥X−Y>−1000 (second reference value), it is determined that the target pixel is close to the saturated state, and the processing moves to step S305.

(c) When the difference between the incident dose X and the saturation characteristic value Y is smaller than or equal to the second reference value indicating that the linearity of the input/output characteristics of the target pixel is maintained, it is determined that the linearity of the input/output characteristics of the target pixel is maintained and the target pixel is not saturated at all. For example, when −1000 (second reference value)≥X−Y, it is determined that the linearity of the input/output characteristics of the target pixel is maintained and the target pixel is not saturated at all, and the processing moves to step S305. Although the values 1000 and −1000 are respectively used as the first reference value and the second reference value above, these values are merely illustrative, and therefore the present invention is not limited to these values.

In step S305, secondary determination is made regarding the weight for the target pixel and the weight for the peripheral pixels based on the dose arrived. When it is determined that (a) the target pixel is completely saturated as a result of comparison in step S304, the processing moves to step S306. When it is determined that (b) the target pixel is close to the saturated state, the processing moves to step S307. When it is determined that (c) the target pixel is not saturated at all, the processing moves to step S308.

In step S306, as the target pixel is completely saturated, the weight for the target pixel is set to 0.

In step S307, as the target pixel is close to the saturated state, the weight for the target pixel and the weight for the peripheral pixels are calculated using a method described later with reference to FIGS. 7 to 9. In the present invention, output values of pixels are corrected by setting a non-zero weight for both of the target pixel and the peripheral pixels. In this way, when an image of peripheral blood vessels is captured using radiopaque dye, or when an image of a minute object is captured, more appropriate pixel correction can be performed.

In step S308, as the target pixel is not saturated at all, there is no need to perform correction using the peripheral pixels with respect to the corresponding dose. Accordingly, the weight for the peripheral pixels is set to zero, and the processing ends (step S310).

In step S309, a process for combining the weight for the target pixel and the weight for the peripheral pixels is performed. The weight for the peripheral pixels set in steps S306 and S307 is combined, and the output values of pixels are corrected based on the combined weight. Especially, when a completely saturated dose arrives at the two-dimensional X-ray detection unit 1004, pixels assigned a weight of zero are dominant in most regions of the two-dimensional X-ray detection unit 1004. In this case, it is effective to execute exception processing, such as clipping processing using a maximum value, at the time of combination.

In step S310, the result of calculation of dose-dependent weights for the target pixel and the peripheral pixels, which was obtained by the preceding step, is output. Subsequently, the present processing ends.

Figure 4:
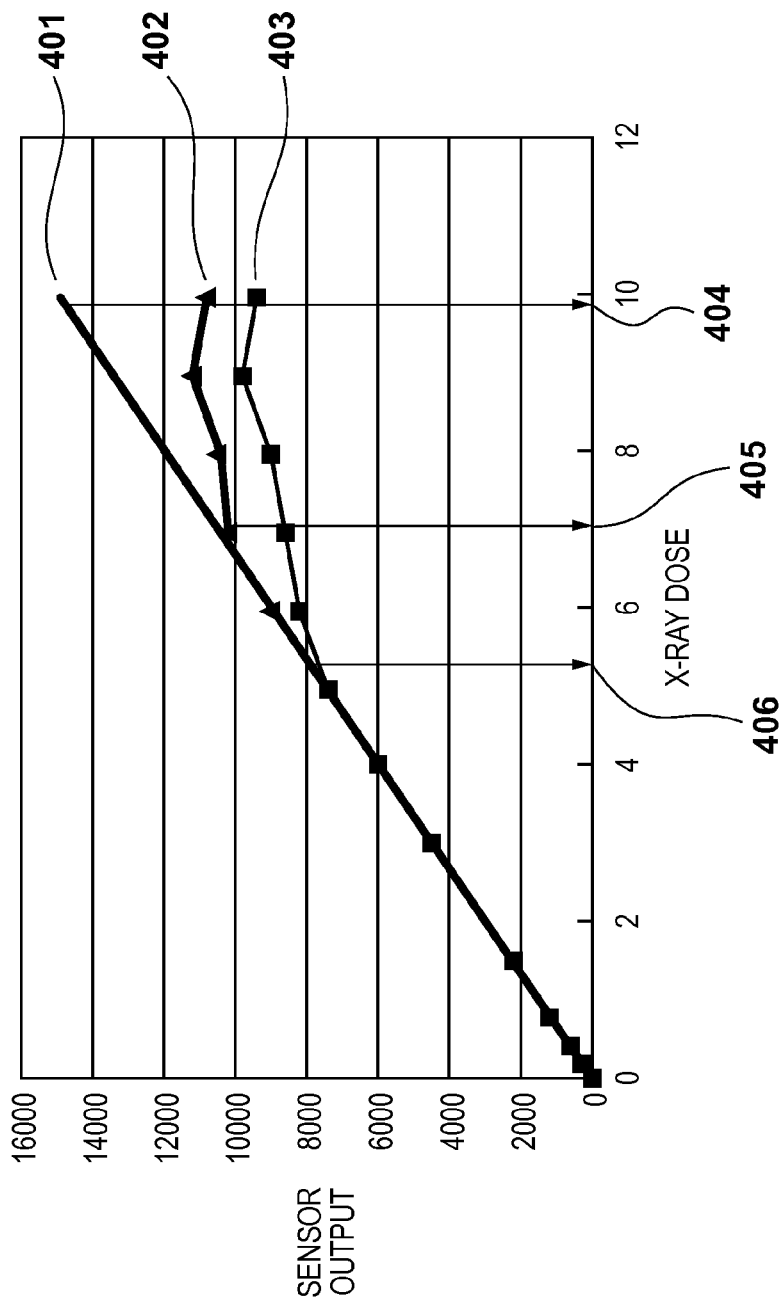
FIG. 4 shows the input/output characteristics and the saturation characteristic values associated with doses of pixels in an image processing apparatus according to an embodiment.

FIG. 4 shows the input/output characteristics and the saturation characteristic values with respect to doses of pixels in a radiation imaging apparatus (image processing apparatus) according to an embodiment of the present invention. In particular, FIG. 4 illustrates pixels with low saturation characteristics with respect to doses.

In FIG. 4, the horizontal axis represents the X-ray dose, and the vertical axis represents the sensor output (output of the two-dimensional X-ray detection unit 1004). In FIG. 4, the linearity of the sensor output for a pixel 401 with respect to the incident X-ray dose is high. A pixel 402 is a defective pixel with which the linearity decreases as the X-ray dose increases, and the sensor output becomes saturated in a somewhat short period of time. A pixel 403 is an example of a defective pixel with which the sensor output becomes saturated at a low X-ray dose compared to the pixel 402. If all the pixels constituting the two-dimensional X-ray detection unit 1004 are the pixel 401 with high linearity, then saturation of the sensor output does not appear in the image even at a high dose, and therefore the output image does not look unnatural. However, there are cases where the characteristics vary more or less with each pixel due to differences in manufacturing conditions, effects of dusts, effects of sequential reading, etc. The saturation characteristics also vary. When the pixel 402 with which the saturation occurs in a somewhat short period of time and the pixel 403 with which the saturation occurs in a short period of time are randomly positioned in a two-dimensional detector of the two-dimensional X-ray detection unit 1004, visible spots appear in an image captured using a high dose. When they change gradually, they look like shades in the image. Correction of output values of pixels according to embodiments of the present invention is advantageous in that more appropriate pixel values can be output at a high dose while making use of the output of a target pixel at a low dose.

As shown in FIG. 4 as an example, when calculating the dose-dependent characteristics of pixels in step S202 of FIG. 2, a dose at which the linearity drops by 3% is used as a reference value for a saturation characteristic value. The saturation characteristics 404 denote a saturation characteristic value of the pixel 401 with high linearity. The saturation characteristics 405 denote a saturation characteristic value of the pixel 402 with which saturation occurs in a somewhat short period of time. The saturation characteristics 406 denote a saturation characteristic value of a defective pixel with which saturation occurs in a shorter period of time. The obtained saturation characteristic values of pixels are stored as dose-dependent maps of the pixels (S203).

Figure 5:
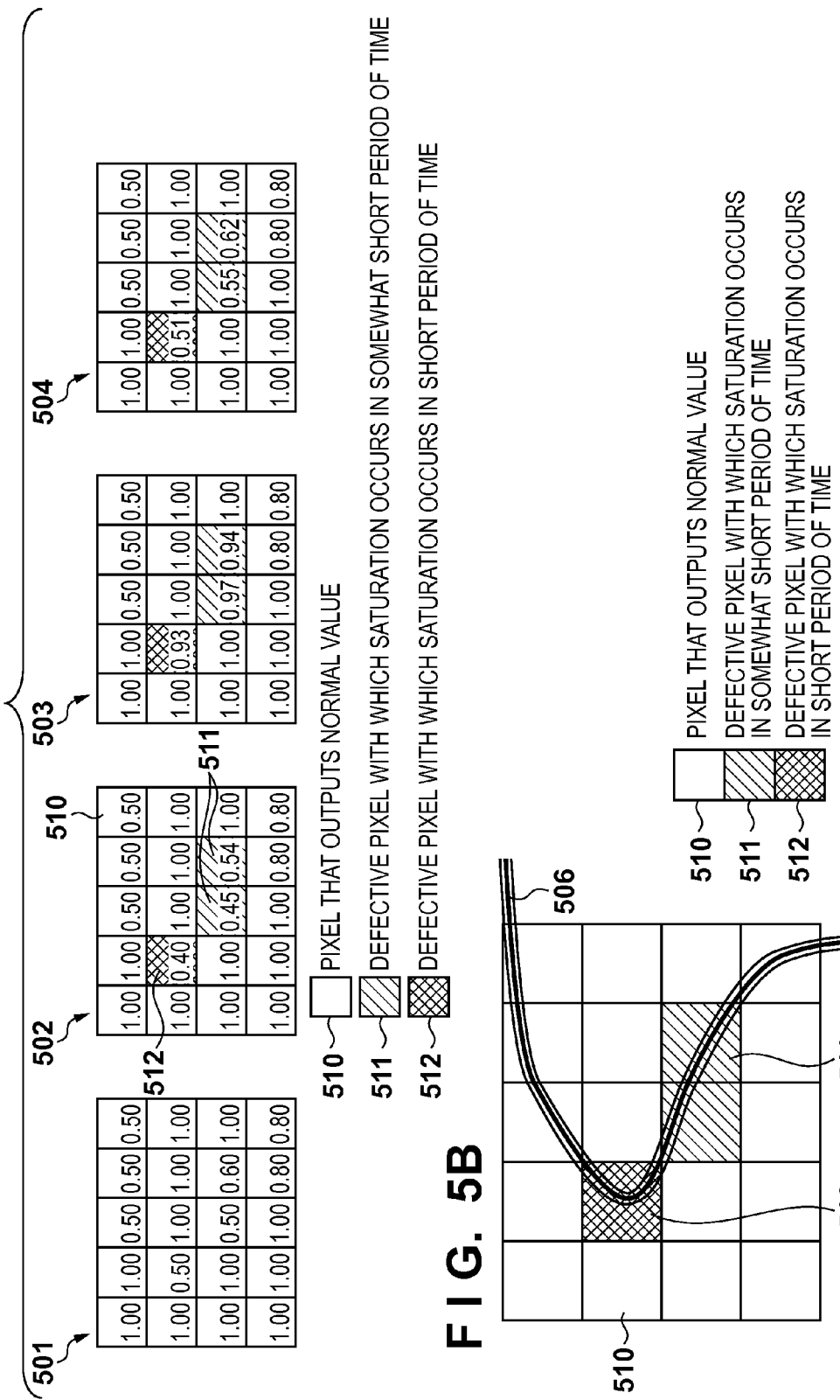
FIGS. 5A and 5B show examples of application of an image processing apparatus according to an embodiment in the case where an object exists.

FIGS. 5A and 5B show examples of application of an image processing apparatus according to an embodiment in the case where an object 506 exists. FIG. 5A illustrates X-ray images of the object 506 and results of correction. FIG. 5B illustrates pixels overlapping the object 506. In FIG. 5A, 501 shows examples of pixel values for the case where there are no anomalous pixels. In the example 501 in FIG. 5A, numerical values are used as pixel values to make it easy to intuitively grasp the image of FIG. 4. Referring to 502 in FIG. 5A, pixels 510 with a white background denote pixels with normal output. Also, a pixel 512 with black highlight denotes a defective pixel with which saturation occurs in a short period of time, and pixels 511 with gray highlight denote defective pixels with which saturation occurs in a somewhat short period of time. The actual pixel values of these defective pixels are smaller than the original pixel values.

In FIG. 5A, 503 shows examples of pixel values obtained by performing conventional defect correction. In the conventional defect correction, a pixel value of a target pixel is corrected using spatially peripheral pixels. The example 503 shows pixel values obtained as a result of correcting defective pixels using spatially peripheral pixels in connection with an object that has a similar size to pixels. It is apparent from the example 503 of FIG. 5A that information of the object is substantially lost.

In FIG. 5A, 504 shows pixel values obtained as a result of correction according to an embodiment of the present invention. According to an embodiment of the present invention, correction is performed using information (pixel value) of a target pixel in accordance with a dose, and therefore correction can be appropriately performed for an extremely minute subject that has a similar size to pixels.

FIG. 5B illustrates pixels in the two-dimensional X-ray detection unit 1004. In reality, pixels are captured in a dispersed state (with a pixel pitch) instead of being captured as continuous rectangular shapes. However, FIG. 5B conceptually shows pixels in continuous rectangular shapes. Here, a thin object such as a catheter and a blood vessel is illustrated as the object 506.

In FIG. 5B, 512 denotes a defective pixel with which saturation occurs in a short period of time, and 511 denotes defective pixels with which saturation occurs in a somewhat short period of time. As the object (catheter, blood vessel, etc.) lies at positions of the defective pixels, if the defective pixels are corrected using peripheral pixels in the same manner as the conventional defect correction (503 of FIG. 5A), then detailed object information may be lost.

On the other hand, according to an embodiment of the present invention, correction is performed using information (pixel value) of a target pixel in accordance with a dose, and therefore output values of pixels can be appropriately corrected for an object (catheter, blood vessel, etc.) that has a similar size to pixels. Note that the present invention is not limited to being applied to dose-dependent pixel value correction, and may be applied to dose-dependent weighting for binning. For example, the range of application of the present invention includes changing weights applied to binning or pixel addition in accordance with doses used for the imaging and dose characteristic values.

Figure 6:
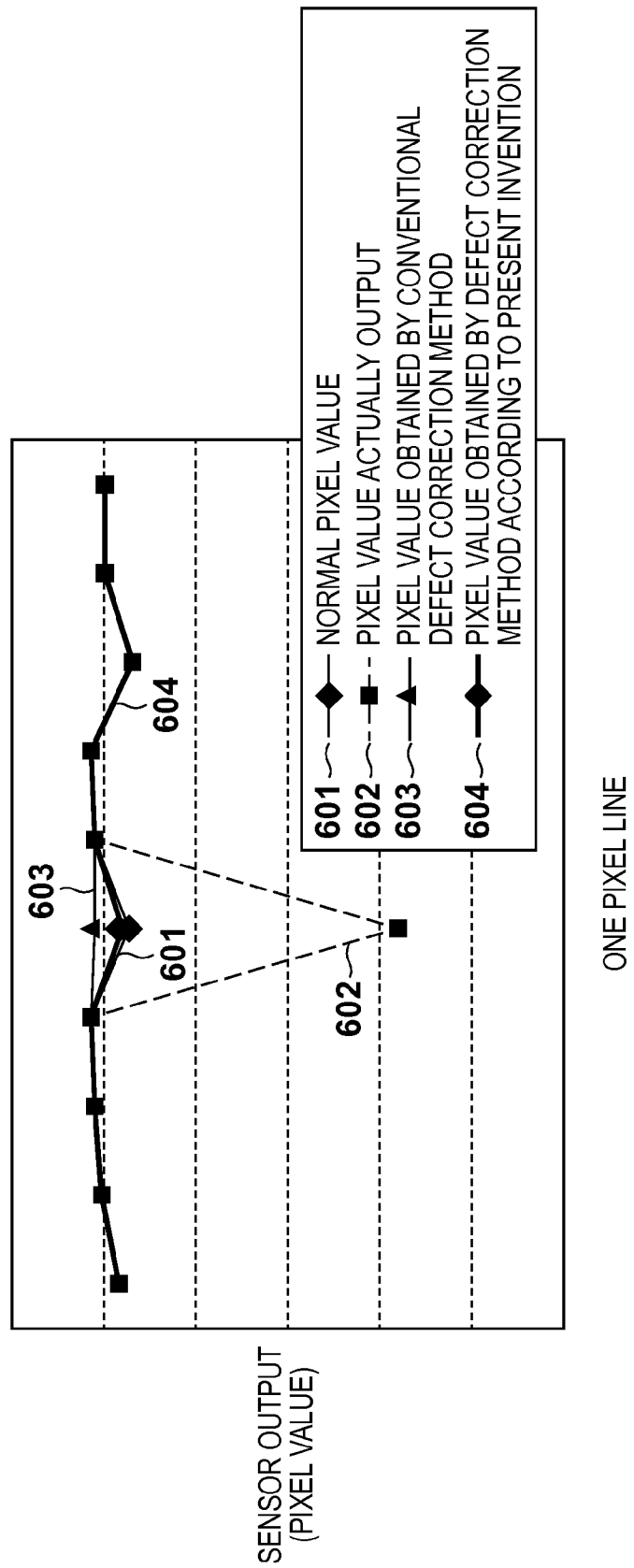
FIG. 6 shows an example of conventional defect correction and an example of defect correction according to the present invention.

FIG. 6 illustrates comparison between an example of conventional defect correction and an example of correction according to an embodiment of the present invention. In order to clarify the effectiveness of correction according to an embodiment of the present invention, FIG. 6 one-dimensionally shows the example of correction according to an embodiment of the present invention and the example of conventional defect correction described with reference to FIG. 5A. In FIG. 6, the horizontal axis represents spatial positions along one pixel line (positions of detection regions of the two-dimensional X-ray detection unit 1004), and the vertical line represents pixel values (two-dimensional X-ray detection unit 1004). A pixel associated with low saturation outputs a somewhat low pixel value compared to a normal pixel value.

In the case where a target pixel includes an object that absorbs X-rays, conventional defect correction causes the sensor output to have a constant value overall, even though the actual sensor output (602) for the target pixel should be low. That is to say, conventionally, defect correction could not be performed appropriately (603). The present embodiment makes it possible to obtain sensor output that is low when it is supposed to be low in correspondence with detection of the object (604) by using information of the target pixel, in a manner similar to the sensor output showing normal pixel values (601).

FIG. 7 shows comparison between the correction method according to the present embodiment and the conventional method. The following describes three different cases depending on X-ray doses.

(A) First, a description is given of the case where the X-ray dose is low to medium. In this case, needless to say, none of the pixels in the two-dimensional X-ray detection unit 1004 shows the saturation characteristics. Therefore, defect correction is not performed, and only the target pixel is used.

(B) A description is now given of the case of pixels on which high-dose X-rays are incident. In this case, the target pixel slightly shows the saturation characteristics. The conventional defect correction method does not perform defect correction using the target pixel, and therefore outputs pixels as-is even if saturation has already started. On the other hand, according to the correction method according to the present embodiment, the weight for the target pixel is decreased and the weight for the peripheral pixels is increased. This makes it possible to correct the output value of the target pixel more appropriately by using information of the peripheral pixels as well.

(C) In the case where a pixel on which extremely high-dose X-rays are incident shows lower saturation characteristics than peripheral pixels, it is considered that the target pixel does not output an appropriate pixel value, and therefore an output image is generated by embedding pixel value information obtained using the peripheral pixels in the target pixel.

That is to say, the conventional defect correction method determines whether to treat a pixel with low saturation characteristics (1) completely as a defective pixel, or (2) as a defective pixel based on whether or not the corresponding dose exceeds the saturation dose. The image processing apparatus according to the present embodiment can execute image processing for correcting pixels while gradually decreasing the weight for the target pixel and increasing the weight for the peripheral pixels as the X-ray dose associated with saturation approaches. As a result, a more appropriate image can be output. Although FIG. 7 shows the example in which correction processing is executed using 3×3 pixels, the purpose of the present invention is not limited to this example.

Figure 8:
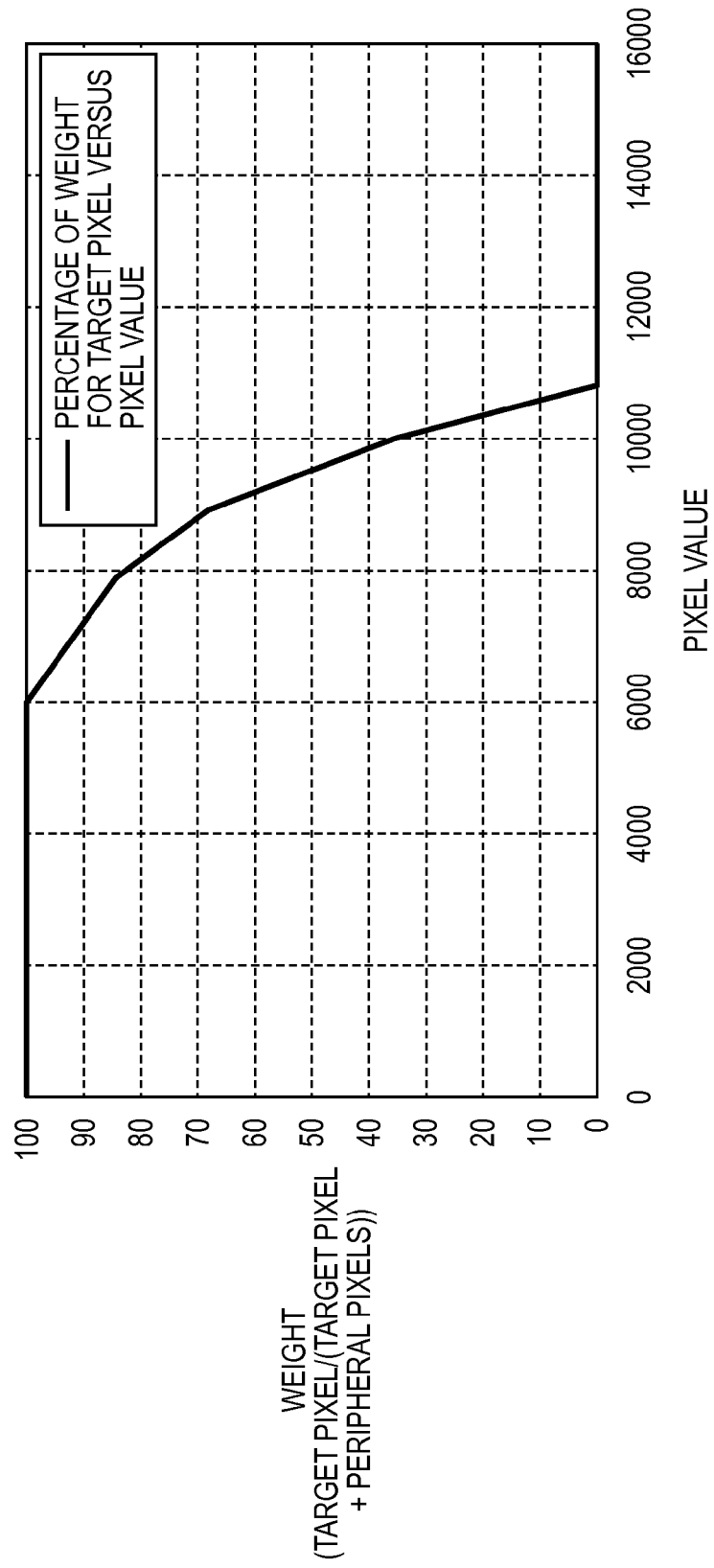
FIG. 8 shows an example of weights used in defect correction of an image processing method according to an embodiment.

FIG. 8 shows an example of a weight table used in the correction processing according to the present embodiment. When a pixel value detected from the captured X-ray image is low (6000 or smaller), the weight for the target pixel is 100%. In this case, there are no effects of peripheral pixels. When a pixel value detected from the captured X-ray image exceeds 6000, the percentage of the weight for the peripheral pixels gradually increases as opposed to the percentage of the weight for the target pixel. Note that the sum of the percentage of the weight for the target pixel and the percentage of the weight for the peripheral pixels is 100%. When the target pixel is substantially saturated, the weight for the target pixel is 0, and correction is performed using the peripheral pixels as with general defective pixels.

FIG. 9 illustrates distribution of saturation characteristics associated with weights used in dose-dependent correction of the correction processing according to the present embodiment. In FIG. 9, (a) indicates the case where saturated pixels appear randomly. In this case, it can be assumed that the probability of appearance of a single saturated pixel is random, and therefore correction can be performed as shown in FIG. 7 in accordance with dose-dependent maps of pixels obtained through the inspection. Furthermore, in FIG. 9, (b) shows the case where saturated pixels are distributed in one direction. Also, in FIG. 9, (c) shows the case where the maps of saturation characteristics show distribution including a discontinuous line. In this case, the weights are calculated and combined using maps of distribution of the overall saturation characteristics in accordance with a flow of steps S303 to S310 shown in FIG. 3. When the maps of saturation characteristics are distributed in one direction as in (b) of FIG. 9, it is more appropriate to perform defect correction by increasing the weight for an image with better saturation characteristics. When the maps of saturation characteristics show distribution including a discontinuous line as in (c) of FIG. 9, discontinuous characteristics may appear in the image around the discontinuous line. Therefore, when (c) of FIG. 9 is detected during the inspection, it is necessary not only to change the weight for defect correction, but also to execute weighting processing that involves increasing the number of peripheral pixels. By thus increasing the number of peripheral pixels, the parts where saturation characteristics are discontinuous can be prevented from being evident.

With the use of saturation characteristic values to which the present invention can be applied, appropriate pixel correction can be performed with a reduction in a memory capacity required for the processing. A memory capacity corresponding to one image can hold the saturation characteristic values of all pixels at most. Furthermore, as the image is versatile, the memory capacity can be further reduced, and the image can be easily compressed and stored in the same procedure as image compression. Furthermore, in the present invention, it suffices to obtain the coordinates and the amounts of only pixels with small saturation characteristic values, and therefore only necessary information may be stored in the memory. As it suffices to store only pixels with small saturation characteristic values, the memory capacity can be reduced, and their size allows them to be easily stored in a memory built in a chip that executes high-speed processing for videos and the like.

In the above-described embodiment, the CPU 1014 obtains the input/output characteristics indicating a relationship between incident doses and pixel values output in correspondence with the incident doses, and obtains the value of a dose at which a pixel that has output a first pixel value shows the saturated state as a saturation characteristic value based on the input/output characteristics. By determining saturation of pixel values with reference to the magnitude of incident doses based on saturation characteristic values, it is possible to obtain an image in which characteristics of the detection unit have been corrected using signals derived from the original configuration of the object.

In step S301, the weight control unit 1018 sets a weighting coefficient for a first pixel value of a pixel having a saturation characteristic value smaller than a threshold (pixel value targeted for correction) to be smaller than a weighting coefficient for a first pixel value of a pixel having a saturation characteristic value larger than the threshold. In this way, the closer a pixel is to saturation, the more the pixel is corrected using peripheral pixels. As a result, a decrease in linearity can be suppressed.

More specifically, determination is made as to whether a difference between the incident dose corresponding to the first pixel value measured by the incident dose conversion unit 1008 and the saturation characteristic value is smaller than or equal to the first reference value and exceeds the second reference value that is smaller than the first reference value. When the difference exceeds the second reference value, in order to correct the first pixel value, a positive weighting value for the first pixel value and a positive weighting value for second pixels, which are output values of peripheral pixels adjacent to a pixel that has output the first pixel value, are calculated. As a result, when the difference between the incident dose and the saturation characteristic value is not so large, a decrease in linearity can be suppressed by using pixel values of both the target pixel and the adjacent pixels while leaving information of the object.

Furthermore, when a difference between the saturation characteristic value and the equivalent value of the dose corresponding to the first pixel value (pixel value targeted for correction) is smaller than a predetermined threshold, the weight control unit 1018 sets a positive value as a weighting coefficient for the second pixels. In this way, a decrease in linearity can be corrected using pixel values that are different from a pixel value targeted for correction. Note that the accuracy of correction can be further improved by selecting, in advance, pixels with excellent linearity in association with pixel values used for correction.

In the case where the equivalent value of the dose corresponding to the first pixel value is larger than the saturation characteristic value by at least a threshold, the weight control unit 1018 sets a weighting coefficient for the second pixels (pixel values used for correction) to be larger than a weighting coefficient for the second pixel values for the case where the equivalent value is not larger than the saturation characteristic value by at least a predetermined threshold. In this way, the image quality can be improved by performing more intense correction on pixels with less desirable linearity. By using pixel values of peripheral pixels adjacent to the target pixel in the image as the second pixel values for correction, correction can be performed using pixel values originating from a similar configuration, and therefore the accuracy of correction can be improved.

Based on pixel values output from the pixels in the two-dimensional X-ray detection unit 1004, the incident dose conversion unit 1008 measures equivalent values of incident doses that are projected by the X-ray generation unit 1001 and incident on the pixels. This allows comparing each pixel in the captured image with the saturation characteristic value.

When a difference between the incident dose corresponding to the first pixel value (pixel value targeted for correction) measured by the incident dose conversion unit 1008 and the saturation characteristic value is larger than the first reference, the weight for the output value of the first pixel is set to 0. Also, a positive weighting value for the output values of the second pixels (pixel values used for correction) is calculated. When linearity is significantly decreased, an image of higher quality can be obtained by performing peripheral interpolation without using the pixel value of the target pixel.

When the difference between the incident dose corresponding to the first pixel value measured by the incident dose conversion unit 1008 and the saturation characteristic value is smaller than or equal to the second reference value, the pixel correction unit 1010 outputs the first pixel value as a corrected pixel value without correcting the first pixel value. More specifically, the weigh for the first pixel value is set to 1, and the weight for the second pixel values is set to 0.

(Second Embodiment)

Second Embodiment describes dose-dependent pixel binning processing using saturation characteristic values, in addition to the processing described in First Embodiment. Pixel binning processing is for merging a plurality of pixels into one group and outputting pixel data of the group as a pixel average. With the pixel binning processing, the number of pixels can be reduced because an image is generated by merging a plurality of pixel values. In particular, when high-speed processing is required for videos and the like, the processing speed decreases if the image size is large. In view of this, the pixel binning processing is used to accelerate the processing.

Figure 10:
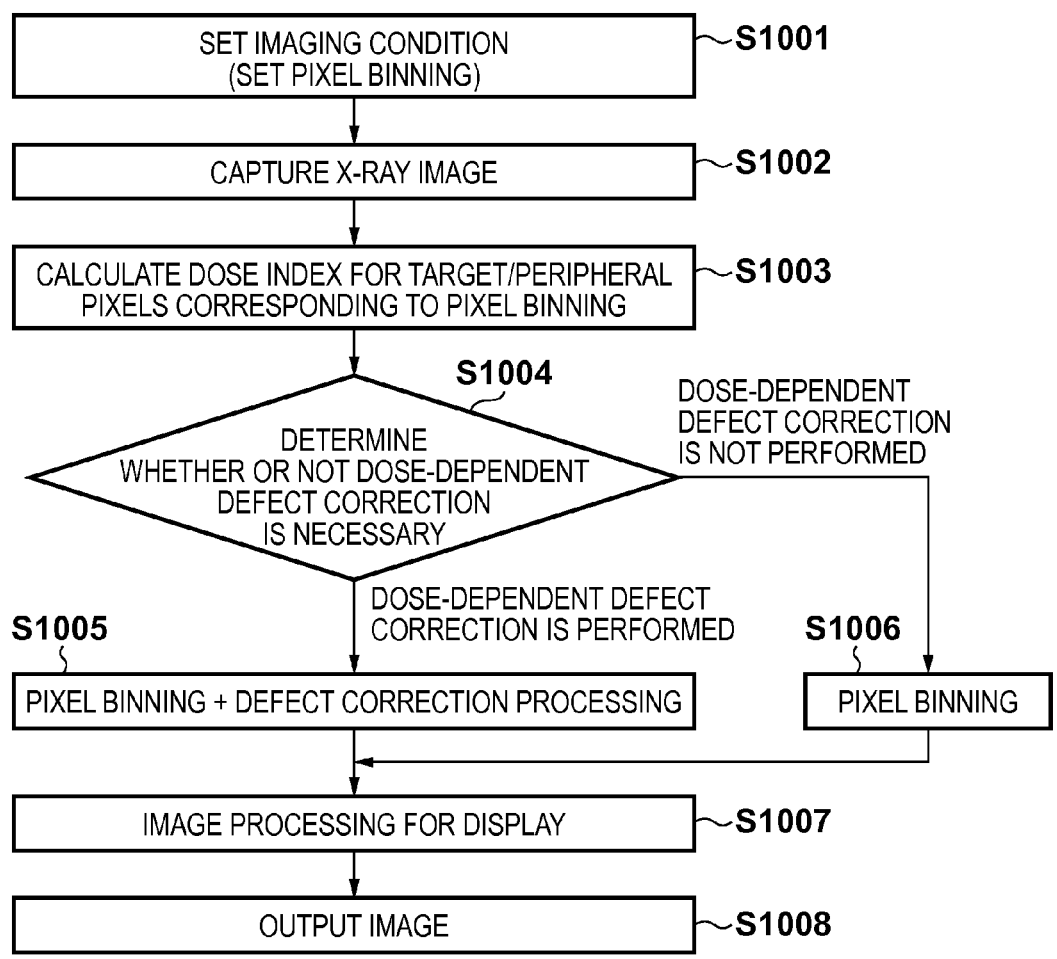
FIG. 10 shows an image processing method according to Second Embodiment.

The system configuration of Second Embodiment is similar to the system configuration of First Embodiment. Second Embodiment differs from First Embodiment in that a program for executing processing shown in the flowchart of FIG. 10 is added to the programs stored in the main memory 1015. A description of the system configuration is omitted. The following describes processing of the present embodiment with reference to the flowchart of FIG. 10.

In step S1001, an imaging condition is set. At the same time, pixel binning is set. As to the settings for binning, whether or not to directly perform binning may be instructed via input from the operation panel 1016. Furthermore, it is possible to set specific binning to be performed when a specific part is imaged in advance, so that the specific binning is set in accordance with a selection of the specific part. In general, as N (pixels)×N (pixels) binning, 2×2 binning and 4×4 binning are often used (N being an integer greater than or equal to two). In step S1002, an X-ray image is captured in accordance with the imaging condition set in step S1001. When the settings are made so that the binning is not performed, the CPU 1014 performs control to switch imaging processing with reference to information of the settings for the binning in the main memory 1015, so as to perform pixel correction described in First Embodiment.

In step S1003, a dose index for the target/peripheral pixels corresponding to pixel binning is calculated. In step S1004, whether or not the dose-dependent pixel correction is necessary is determined using information of the input/output characteristics of pixels and the incident doses. When it is determined that the dose-dependent pixel correction is necessary, the processing moves to step S1005. On the other hand, when it is determined in step S1004 that the dose-dependent pixel correction is not necessary, the processing moves to step S1006.

In step S1005, the pixel binning and the pixel defect correction processing are performed at the same time. Conventionally, at the time of binning, pixels with undesirable saturation characteristics (defective pixels) were also used as a target of pixel binning together with other pixels. In Second Embodiment, as the saturation characteristics are obtained in advance as the input/output characteristics of pixels, a weight for pixels with undesirable saturation characteristics can be decreased at the time of pixel binning. Furthermore, even when the peripheral pixels around the target pixel are outside the range of binning pixels specified by N (pixels)×N (pixels) (e.g., pixels at a position N+1), the weighting processing can be executed using the peripheral pixels prior to the pixel binning, and therefore more appropriate pixel correction can be performed.

The weight control unit 1018 calculates a difference between the output value of one certain pixel included among a plurality of pixels constituting one group output through the pixel binning and the incident dose. The weight control unit 1018 then compares the calculated difference with a first reference value indicating that the input/output characteristics of the pixel are saturated. When the result of comparison shows that the difference is larger than the first reference value, the weight control unit 1018 sets a weight for the output value of one certain pixel to 0. The weight control unit 1018 then calculates the value of a weight for output values of peripheral pixels adjacent to one certain pixel.

The weight control unit 1018 determines whether the difference between the output value of one certain pixel and the incident dose is smaller than or equal to the first reference value and exceeds a second reference value indicating that the linearity of the input/output characteristics of one certain pixel is maintained. When this condition of determination is satisfied, the weight control unit 1018 calculates the value of a weight for one certain pixel and the value of a weight for output values of peripheral pixels adjacent to one certain pixel, so as to correct the output value of one certain pixel.

The weight control unit 1018 determines whether the difference between the output value of one certain pixel and the incident dose is smaller than or equal to the second reference value indicating that the linearity of the input/output characteristics of one certain pixel is maintained. When this condition of determination is satisfied, the weight control unit 1018 outputs the output value of one certain pixel as-is, and sets the value of a weight for output values of peripheral pixels adjacent to one certain pixel to zero. Here, the output values of pixels constituting one group output through the pixel binning, and the output values of pixels that do not constitute one group, are used as the output values of the peripheral pixels adjacent to one certain pixel.

When the result of determination in the preceding step S1004 shows that the dose-dependent pixel correction is not necessary, the pixel binning processing is executed in step S1006.

In step S1007, image processing for display is executed. In step S1008, the image is output. Second Embodiment has described the example in which the pixel binning processing is executed after performing the imaging. However, the purpose of the present invention is not limited to this example.

FIGS. 11A to 11C show examples of pixel binning according to Second Embodiment of the present embodiment. FIG. 11A shows examples of pixel values prior to the pixel binning processing. In FIG. 11A, hatched pixels 1101 and 1102 are pixels with which saturation occurs in a short period of time in the displayed image (pixels with undesired saturation characteristics), and a hatched pixel 1103 is a pixel with which saturation occurs in a somewhat short period of time. Under the assumption that the image shown in FIG. 11A is the input image, FIG. 11B shows examples of pixel values obtained through conventional binning processing, and FIG. 11C shows examples of pixel values obtained through the pixel binning processing according to Second Embodiment.

FIG. 11B shows pixel values obtained through conventional binning processing. Here, 2 (pixels)×2 (pixels) binning processing is executed on pixels with undesirable saturation characteristics. In this case, the amount of effects of the pixels with undesired saturation characteristics is ¼ in pixels 1104, 1105 and 1106 that are each constituted as one group as a result of the binning processing. However, even after the binning processing, the pixel values with undesired saturation characteristics are output as part of the displayed image. On the other hand, in Second Embodiment, the pixel binning processing is executed on pixels with undesired saturation characteristics while decreasing weights in accordance with doses. By combining the binning processing according to Second Embodiment and the processing for correcting output values of pixels described in First Embodiment, correction can be performed so that all pixels output normal values as shown in FIG. 11C.

Note that in the present invention, a defective pixel denotes an abnormal pixel or a pixel with defective output. More specifically, a defective pixel denotes a pixel that largely deviates from pixel values of surrounding pixels at a certain dose. For example, there is a method for dividing an image into certain regions, and defining a pixel that deviates from an average pixel value of pixels included in each divided region (region-based partial image) by at least eight times the standard deviation as an anomalous pixel (defective pixel). Out of such anomalous pixels, defective pixels that occur due to an abnormality in elements, circuits, etc. have been illustrated in the embodiments of the present invention. The present invention, however, is not limited to this example.

Furthermore, although a dose denotes an X-ray dose in the present invention, it may instead denote the amount of light or a pixel value equivalent thereto. In particular, in an image processing apparatus that performs photoelectric conversion after the X-rays are converted to visible light using phosphors, the amount of light that arrives at (is incident on) each pixel and the amount of X-rays substantially bear the same meaning. Furthermore, a presumed pixel value obtained through conversion to sensitivity with linearity at a certain X-ray dose or a certain amount of light substantially bears the same meaning, with the only difference being a device that measures doses. A dose does not necessarily encompass only a physical dose per se, but also encompasses a physical amount that is substantially proportional to the dose like pixel values.

As set forth above, the present embodiment can merge a plurality of pixels into one group and set pixel binning, which is for outputting pixel data of one group as a pixel average, as an imaging condition. Thus, there are cases where a difference between the first pixel value (pixel value targeted for correction) included among a plurality of pixels constituting one group output through the pixel binning and the saturation characteristic value is larger than the first reference value. In this case, the weight control unit 1018 sets a weight for the first pixel value to 0. Then, a positive weighting value for second pixel values, which are the output values of peripheral pixels adjacent to the pixel that outputs the first pixel value, is calculated. In this way, pixels with decreased linearity are not used in the averaging process, and therefore the quality of the image obtained through the binning can be improved.

Also, there are cases where the difference between the first pixel value included among the plurality of pixels constituting one group output through the pixel binning and the saturation characteristic value is smaller than or equal to the first reference value and exceeds the second reference value that is smaller than the first reference value. In this case, in order to correct the output value of the first pixel, the weight control unit 1018 calculates a positive weighting value for the first pixel and a positive weighting value for the output values of peripheral pixels adjacent to one pixel. In this way, pixels with somewhat decreased linearity contribute to pixel values obtained through the binning, and therefore the image reflects information of the object to a greater extent. Furthermore, local fluctuations in the S/N ratio caused by local fluctuations in the number of averaging processes can be suppressed, thus alleviating the unnatural appearance of the image as a whole.

In addition, pixel values constituting one group output through the pixel binning, and pixel values that do not constitute one group, are used as the second pixel values output from the peripheral pixels adjacent to the pixel that outputs the first pixel value. Thus, when a pixel needs to be corrected due to a decrease in its linearity, the first pixel value is corrected using pixel values outside the N×N binning region as well. In this way, even when the binning region is small with respect to the number of pixels to be used for correction, it is possible to obtain a pixel value from an appropriately corrected target pixel.

Also, there are cases where the difference between the first pixel value included among the plurality of pixels constituting one group output through the pixel binning and the saturation characteristic value is smaller than or equal to the second reference value. In this case, the weight control unit 1018 does not allow the pixel binning unit 1011 to correct the first pixel value. More specifically, the weight control unit 1018 makes the weight for the first pixel equal to the weight for pixels used for the binning.

In the above-described embodiments, defective pixels and pixels with undesirable linearity are corrected through smoothing processing using spatially peripheral pixels. However, embodiments are not limited in this way. As one embodiment, a plurality of frame images or sliced images may be obtained from X-ray imaging, CT imaging, tomosynthesis imaging, etc. In this embodiment, the target pixel is corrected using corresponding pixels in a plurality of images captured at different points of time. In the case of a video obtained through X-ray imaging, the correction processing may be executed by weighting pixel values of corresponding pixels in temporally preceding and succeeding frames, and pixel values of pixels adjacent to these corresponding pixels. In this case, the weight control unit 1018 determines appropriate weights and outputs them to the pixel correction unit 1010 and the pixel binning unit 1011. Here, appropriate weights are determined using a frame rate, a pixel pitch, a spatial distance between sliced images, and the like as parameters. For example, a weight for peripheral pixels in one image is set to be larger for a smaller pixel pitch. Also, a weight for pixels in preceding and succeeding frames and adjacent slices is set to be larger for a higher frame rate, or for a smaller spatial distance between sliced images.

According to this embodiment, defective pixels and pixels with undesirable linearity can be corrected to have more appropriate pixel values by using preceding and succeeding frames and adjacent slices. In the case where a video constituted by a plurality of frame images is targeted for processing, second pixel values used for correction may include pixel values in frame images that are different from a frame image including the first pixel value output from the pixel that has output the first pixel value. In this case, correction can be performed using pixel values originating from a similar configuration, provided that the configuration does not exhibit significant movements or changes temporally. As a result, the accuracy of correction is improved. Note that the accuracy is further improved by using pixel values of the same image in combination with pixel values of other images. In particular, even when the object exhibits movements or changes, the correction can be performed with high accuracy by selecting and using more appropriate pixels with information of the amount of movement, a frame rate, and a slice interval, or by using appropriate weights. In terms of movements and similar configuration, it is preferable to use adjacent pixels in the same image, pixels at the same position in immediately preceding and succeeding frames, or pixels adjacent thereto.

The above-described embodiments perform control to switch processing based on a comparison/difference between the equivalent value of a dose calculated from a pixel value and a saturation characteristic value which is a value of a dose at which the pixel value is in a saturated state. As another embodiment, a pixel value may be compared with a value of a pixel corresponding to a dose at which the pixel value is in a saturated state. This allows omitting the approximation processing when calculating the equivalent value of a dose from a pixel value, thus ultimately improving the accuracy of correction.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275086, filed Dec. 15, 2011, which is hereby incorporated by reference herein in its entirety.

What is claimed is:

1. An image processing apparatus that processes a radiation image obtained from a detector in which a plurality of pixels are two-dimensionally arranged, comprising:
    an obtainment unit configured to obtain a radiation image;
    a control unit configured to, in accordance with radiation dose characteristics of a first pixel in the detector and an incident radiation dose in the detector, control a first weighting coefficient for a first pixel value of the first pixel and a second weighting coefficient for a second pixel value of a second pixel that is different from the first pixel; and
    a correction unit configured to correct the first pixel value in the obtained radiation image based on the first pixel value, the first weighting coefficient, the second pixel value and the second weighting coefficient,
    wherein the second pixel is a peripheral pixel of the first pixel.

2. An image processing apparatus that processes a radiation image obtained from a detector in which a plurality of pixels are two-dimensionally arranged, comprising:
    an obtainment unit configured to obtain a radiation image;
    a control unit configured to, in accordance with radiation dose characteristics of a first pixel in the detector and an incident radiation dose in the detector, control a first weighting coefficient for a first pixel value of the first pixel and a second weighting coefficient for a second pixel value of a second pixel that is different from the first pixel;
    a correction unit configured to correct the first pixel value in the obtained radiation image based on the first pixel value, the first weighting coefficient, the second pixel value and the second weighting coefficient; and
    another obtainment unit configured to obtain input/output characteristics indicating a relationship between incident doses and pixel values output in correspondence with the incident doses,
    wherein said other obtainment unit further obtains a value of a dose or a pixel value at which a pixel that has output the first pixel value is in a saturated state as a saturation characteristic value based on the input/output characteristics.

3. The image processing apparatus according to claim 2, wherein said control unit sets a first weighting coefficient for the first pixel value of a pixel with a saturation characteristic value smaller than a threshold to be smaller than a first weighting coefficient for the first pixel value of a pixel with a saturation characteristic value larger than the threshold.

4. The image processing apparatus according to claim 2, wherein, in a case where a difference between the saturation characteristic value and an equivalent value of a dose corresponding to the first pixel value is smaller than a predetermined threshold, said control unit sets a positive value as a second weighting coefficient for the second pixel.

5. The image processing apparatus according to claim 2, wherein, in a case where an equivalent value of a dose corresponding to the first pixel value is larger than the saturation characteristic value by at least a predetermined threshold, the control unit sets a second weighting coefficient for the second pixel to be larger than a second weighting coefficient for the second pixel value for a case where the equivalent value of the dose corresponding to the first pixel value is not larger than the saturation characteristic value by at least the predetermined threshold.

6. The image processing apparatus according to claim 1, wherein the second pixel value includes a pixel value output from a pixel adjacent to a pixel that has output the first pixel value in the image.

7. The image processing apparatus according to claim 1, wherein, in a case where the image is a video constituted by a plurality of frame images, the second pixel value includes a pixel value in a frame that is different from a frame image including the first pixel value output from a pixel that has output the first pixel value.

8. The image processing apparatus according to claim 1, wherein the second pixel value includes a pixel value in a frame that is different from a frame image including the first pixel value and that is output from pixels adjacent to a pixel that has output the first pixel value.

9. The image processing apparatus according to claim 1, further comprising a measurement unit configured to, based on a pixel value output from a pixel in the detector, measure an equivalent value of a radiation dose projected by a projection unit and incident on the pixel.

10. The image processing apparatus according to claim 2, wherein, in a case where a difference between an incident dose corresponding to the first pixel value and the saturation characteristic value is larger than a first reference, said control unit sets a weight for an output value of the first pixel to zero and calculates a positive weighting value for an output values of the second pixel.

11. The image processing apparatus according to claim 10, wherein, in a case where the difference between the incident dose corresponding to the first pixel value and the saturation characteristic value is smaller than or equal to a first reference value and exceeds a second reference value that is smaller than the first reference value, said control unit calculates a positive weighting value for the first pixel value and a positive weighting value for the second pixel which are output values of peripheral pixels adjacent to a pixel that outputs the first pixel value, so as to correct the first pixel value.

12. The image processing apparatus according to claim 11, wherein, in a case where the difference between the incident dose corresponding to the first pixel value and the saturation characteristic value is smaller than or equal to the second reference value, said control unit outputs the first pixel value as-is without performing the correction.

13. The image processing apparatus according to claim 1, further comprising a setting unit configured to merge a plurality of pixels into one group and set pixel binning, which is for outputting pixel data of said one group as a pixel average, as an imaging condition.

14. The image processing apparatus according to claim 13, wherein, in a case where a difference between the first pixel value included among a plurality of pixels constituting one group output through the pixel binning and the saturation characteristic value is larger than a first reference value, said control unit sets a weight for the first pixel value to zero and calculates a positive weighting value for the second pixel value which is an output value of at least one peripheral pixel adjacent to a pixel that outputs the first pixel value.

15. The image processing apparatus according to claim 14, wherein, in a case where the difference between the first pixel value included among the plurality of pixels constituting said one group output through the pixel binning and the saturation characteristic value is smaller than or equal to the first reference value and exceeds a second reference value that is smaller than the first reference value, said control unit calculates a positive weighting value for the first pixel and a positive weighting value for output values of peripheral pixels adjacent to the first pixel, so as to correct an output value of the first pixel.

16. The image processing apparatus according to claim 15, wherein, in a case where the difference between the first pixel value included among the plurality of pixels constituting said one group output through the pixel binning and the saturation characteristic value is smaller than or equal to the second reference value, said control unit outputs the first pixel value as-is without performing the correction.

17. The image processing apparatus according to claim 15, wherein pixel values that constitute said one group output through the pixel binning and pixel values that do not constitute said one group are used as the second pixel values of the peripheral pixel adjacent to the pixel that outputs the first pixel value.

18. The image processing apparatus according to claim 1, wherein said control unit controls whether to output the first pixel value, to output a value obtained by correction through weight averaging processing for the first pixel value and the second pixel value, or to output a value obtained by interpolation using the second pixel values, as a first pixel value corresponding to the first pixel in the radiation image.

19. An image processing method used in an image processing apparatus that processes a radiation image obtained from a detector in which a plurality of pixels are two-dimensionally arranged, comprising:
   an obtainment step of obtaining a radiation image;
   a control step of, in accordance with radiation dose characteristics of a first pixel in the detector and an incident radiation dose in the detector, controlling a first weighting coefficient for a the first pixel value of the first pixel and a second weighting coefficient for a second pixel value of a second pixel that is different from the first pixel; and
   a correction step of correcting the first pixel value in the obtained radiation image based on the first pixel value, the first weighting coefficient, the second pixel value and the second weighting coefficient,
   wherein the second pixel is a peripheral pixel of the first pixel.

20. A non-transitory computer readable storage medium storing a program for causing a computer to execute the image processing method according to claim 19.

* * * * *